United States Patent [19]
Ohtomo et al.

[11] Patent Number: 5,953,116
[45] Date of Patent: Sep. 14, 1999

[54] TILT DETECTING DEVICE

[75] Inventors: Fumio Ohtomo; Hiroshi Koizumi; Jun-ichi Kodaira, all of Tokyo-to, Japan

[73] Assignee: Kabushiki Kaisha TOPCON, Tokyo-to, Japan

[21] Appl. No.: 09/018,907

[22] Filed: Feb. 5, 1998

[30] Foreign Application Priority Data

Feb. 21, 1997 [JP] Japan .................................... 9-053976

[51] Int. Cl.$^6$ ...................................................... G01C 9/18
[52] U.S. Cl. ............................................. 356/249; 33/366
[58] Field of Search ................................... 356/249, 138; 33/366, 365, 377, 379, 389, 390, DIG. 3, 348, 348.2; 250/231.1, 231.16, 577

[56] References Cited

U.S. PATENT DOCUMENTS 4,956,922  9/1990  Bodewes .
5,101,570  4/1992  Shimura .

*Primary Examiner*—K P Hantis
*Attorney, Agent, or Firm*—Nields, Lemack & Dingman

[57] ABSTRACT

A tilt detecting device of the present invention comprises a bubble tube 21, a light emitting element 22 for emitting detection light and photodetector elements 23 and 24 arranged opposite to each other with the bubble tube therebetween, and at least a light shading plate 35 disposed on an optical path of the detection light 26 and for partially blocking off light components entering the photodetector elements from the light emitting element, whereby a part of the detection light entering the photodetector elements is blocked off and it increase difference and ratio of light amounts between the case where the detection light passes through the air bubble of the bubble tube and the case where it passes through only the liquid portion of the bubble tube, and tilt detection accuracy is improved.

7 Claims, 10 Drawing Sheets

TILT DETECTING DEVICE

BACKGROUND OF THE INVENTION

The present invention relates to a tilt detecting device equipped with an electric bubble tube, and in particular, to a tilt detecting device for precision instrument such as survey instrument equipped with a light transmission type electric bubble tube.

The instrument such as survey instrument is generally installed at a predetermined place during surveying, and the state of installation of the instrument is adjusted to a reference position in each surveying operation according to a tilt detecting device. The survey instrument forms a reference line, a reference horizontal plane, etc., and the adjustment of the reference position must be performed with high accuracy.

In the following, description will be given on a survey instrument equipped with a tilt detecting device.

As one type of survey instruments, there is a laser survey instrument. The laser survey instrument forms an irradiation plane by projecting a laser beam with directivity for rotary irradiation in the horizontal direction. A photodetector (not shown) arranged on the rotary irradiation plane receives and detects the laser beam, and a reference line and a reference plane are obtained.

Brief description will be given now on the laser survey instrument as described above referring to FIG. 13.

Figure 13:
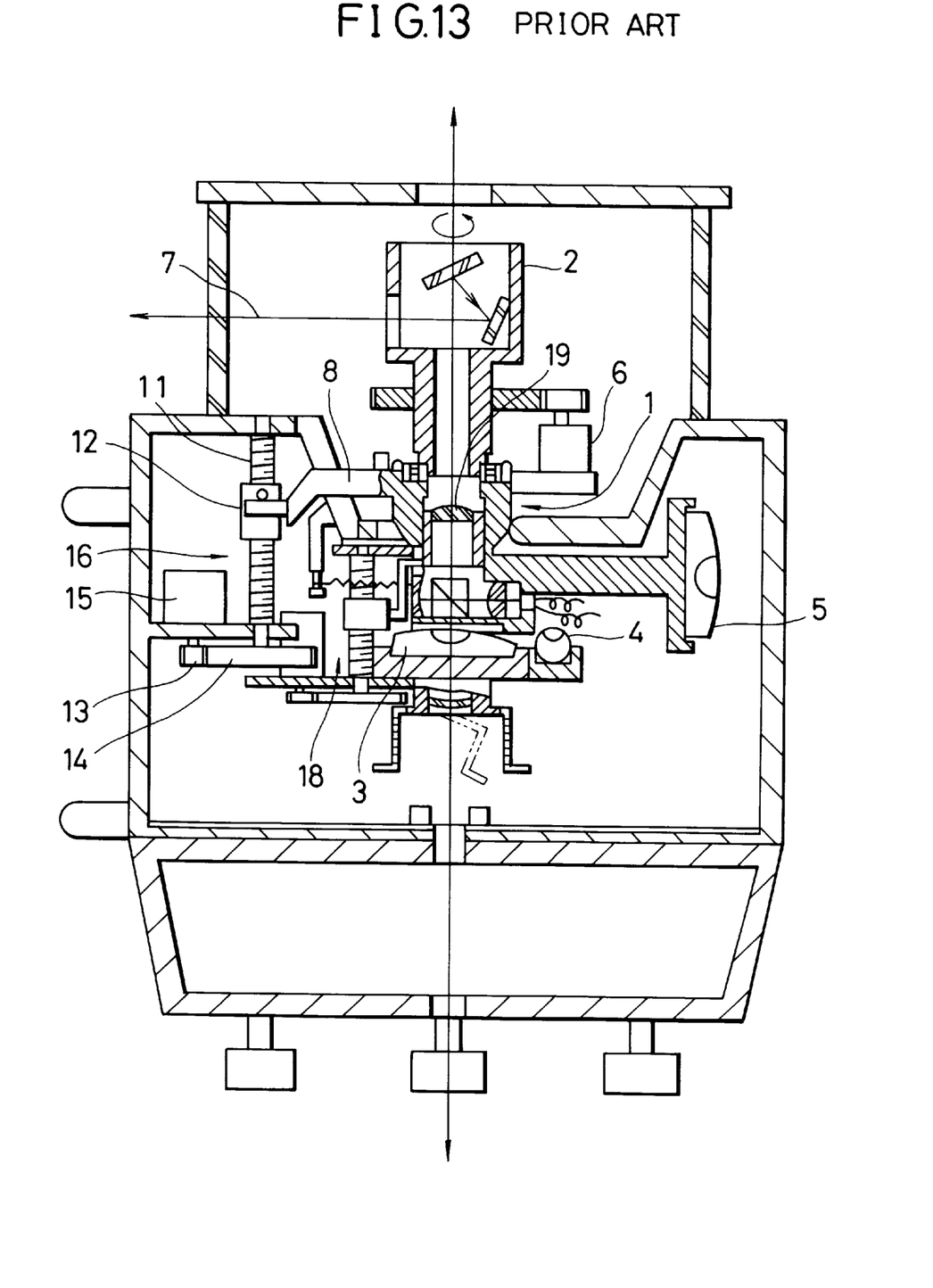
FIG. 13 is a cross-sectional view of a laser survey instrument equipped with a tilt detecting device.

In FIG. 13, reference numeral 1 represents a laser beam emitter, and it is supported in such a manner that it can be tilted in any direction, and a rotator 2 rotatable around an optical axis of the laser beam emitter 1 is provided on its head. The laser beam emitter 1 comprises tilt sensors 3 and 4 (transmission type electric bubble tubes) in two horizontal directions, which are perpendicular to each other, and a tilt sensor 5 in the vertical direction. The tilt sensor 5 and the tilt sensors 3 and 4 as well as a tilt detection controller (not shown) constitute a tilt detecting device.

The rotator 2 deflects the laser beam emitted in the vertical direction to the horizontal direction and is rotated by a scanning motor 6, thereby performing rotary irradiation of the laser beam 7.

From the laser beam emitter 1, arms 8 and 9 (arm 9 is not shown in the figure) are extended in two horizontal directions, which are perpendicular to each other, and tips of the arms 8 and 9 are engaged with a tilting mechanism.

The tilting mechanism comprises two sets of tilt driving units 16 and 17 (tilt driving unit 17 is not shown) provided with respect to the arms 8 and 9 respectively and a tilt control unit (not shown) for controlling the tilt driving units 16 and 17. Each of the tilt driving units 16 and 17 comprises a screw 11 extending in the direction of the optical axis of the laser beam emitter 1, a nut 12 screwed on the screw 11 and in contact with tip of the arms 8 or 9, and a tilt adjusting motor 15 for rotating the screw 11 via gears 13 and 14. In the figure, reference numeral 18 represents a focus adjusting device, which performs focusing of the laser beam 7 by moving a condenser lens 19 arranged in an optical path of the laser beam emitter 1 in the direction of the optical axis.

When the laser beam 7 is projected in the horizontal direction from the rotator 2 and the rotator 2 is rotated by the scanning motor 6, an irradiation plane is formed, and when the laser beam 7 scanning position is set at a predetermined position by the photodetecting device, a reference plane is obtained.

When the reference plane is obtained, it is possible to easily determine working position in extensive range, e.g. for setting of window position in interior finishing work during building construction or for ground leveling in civil engineering work.

Each of the tilt sensors 3, 4 and 5 of the tilt detecting device is based on a combination of a light emitting element, a photoelectric conversion element and a bubble tube. In the following, description will be given on conventional type tilt sensors 3, 4 and 5 referring to FIGS. 14 to 16, and an general feature of the tilt detecting device will be described referring to FIG. 17. The tilt sensor 3 has the same structure as the tilt sensors 4 or 5, and description will be given here only on the tilt sensor 3.

Figure 14:
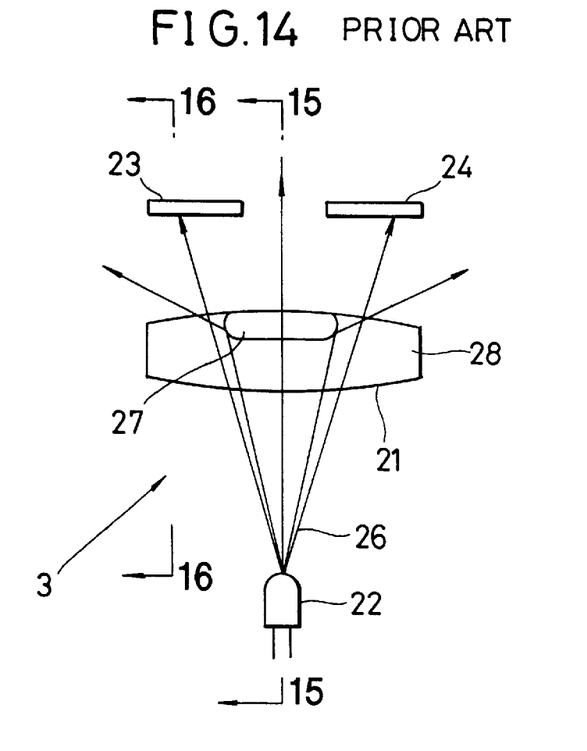
FIG. 14 is a schematical front view of a conventional example.

A light emitting element 22 such as LED is arranged in a direction perpendicular to an axis of a bubble tube 21, and a pair of photodetector elements 23 and 24 are arranged at opposite positions to the light emitting element 22 with the bubble tube 21 therebetween and at symmetrical positions with respect to an optical axis of the light emitting element 22 with a predetermined distance between them. Signals from the photodetector elements 23 and 24 are inputted to a tilt detection controller 25.

Of detection light 26 emitted from the light emitting element 22, central light components are diverged when passing through an air bubble 27 of the bubble tube 21, and peripheral components of the detection light 26 except the central components are converged by the bubble tube 21 and reach the photodetector elements 23 and 24. The photodetector elements 23 and 24 detect the tilt from amount of received light components of the detection light 26. The amount of the light passing through a portion with the air bubble 27 is different from the amount of the light passing through only a liquid portion 28.

Figure 17:
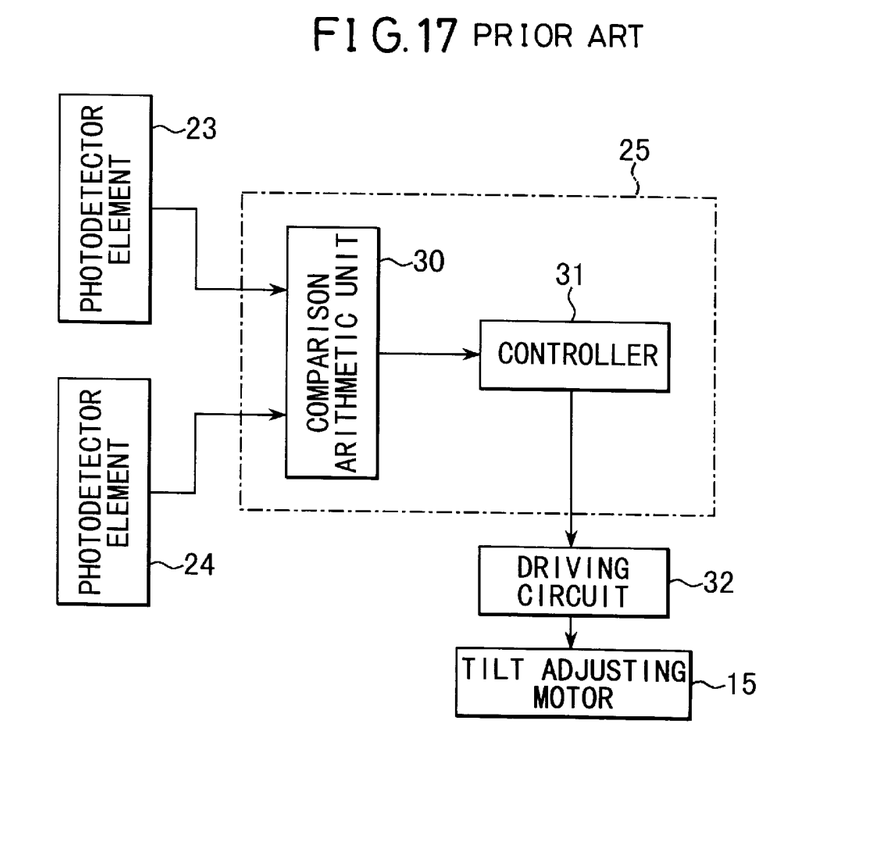
FIG. 17 is a block diagram of a conventional example.

As shown in FIG. 17, the tilt detection controller 25 comprises a comparison arithmetic unit 30 where photodetection signals from the photodetector elements 23 and 24 are inputted, and a controller 31 for issuing a control signal based on a signal from the comparison arithmetic unit 30. A driving circuit 32 drives the tilt adjusting motor 15 based on a control signal from the detection light 26.

First, description will be given how the detection light 26 passes through the bubble tube 21 referring to FIGS. 14 to 16 and FIG. 18.

Figure 18:
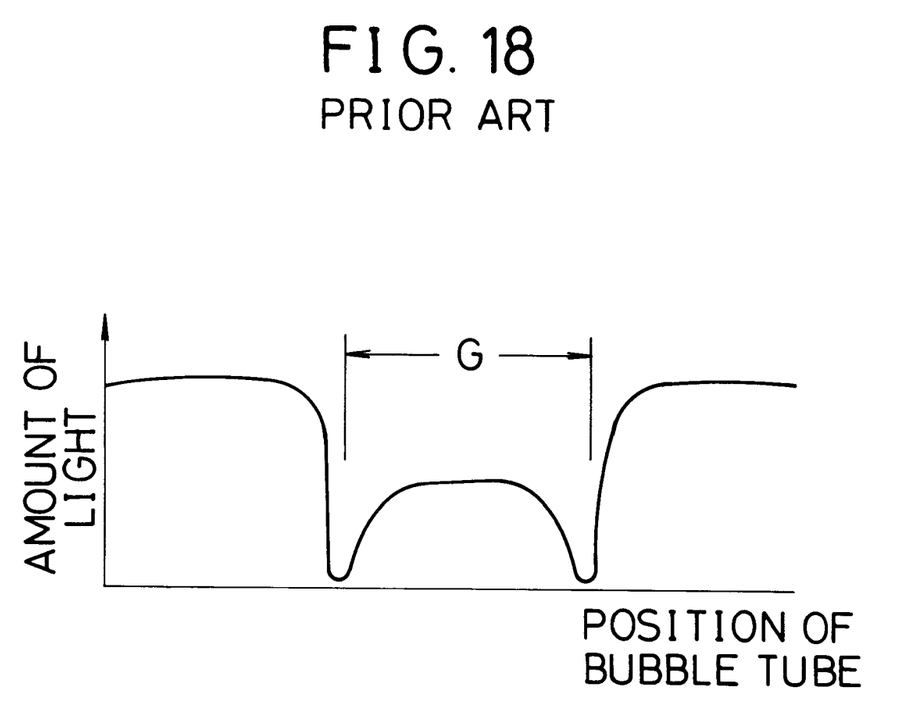
FIG. 18 is a diagram showing distribution of amount of light passing through the bubble tube in the conventional type device.

FIG. 14 shows how the detection light 26 passes through the bubble tube 21 in the longitudinal direction. Because the detection light 26 passes through the air bubble 27 and the liquid portion 28 almost in the straight direction, the detection light 26 is received by the photodetector elements 23 and 24. At boundary portion between the air bubble 27 and the liquid portion 28, the detection light 26 is reflected and it is not received by the photodetector elements 23 and 24. FIG. 18 shows amount of light components of the detection light 26 passing through in the longitudinal direction of the bubble tube 21. The portion with the least amount of light represents the boundary portion between the air bubble 27 and the liquid portion 28.

Figure 15:
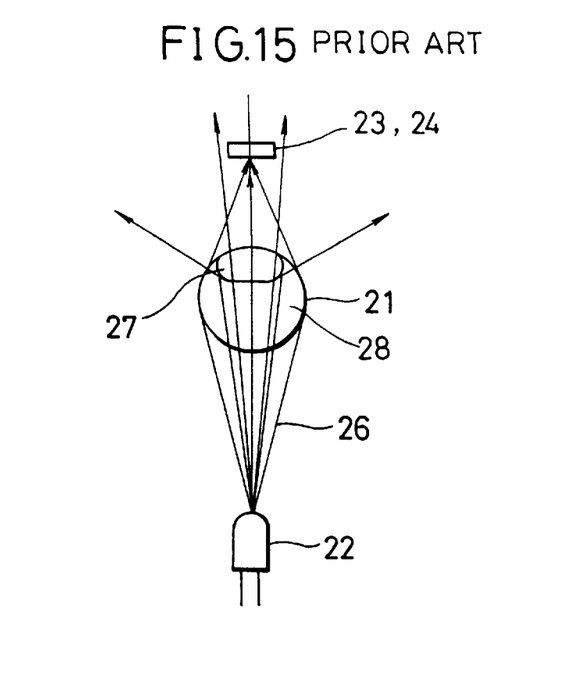
FIG. 15 is an arrow diagram along the line C—C in FIG. 14.

FIG. 15 is a cross-sectional view of the air bubble 27 of the bubble tube 21. The light straightly passes through the bubble tube 21 and reaches the photodetector elements 23 and 24. Except the central portion of the air bubble, the components detection light 26 passing through the air bubble 27 is not converged but it is diverged although it depends on radius of curvature of the air bubble 27 and the bubble tube 21. The components of the detection light 26 passing through the liquid portion 28 around the body of the bubble tube 21 are converged toward the photodetector elements 23 and 24 by optical effect. The components of the detection light passing through boundary surface of the air bubble are mostly reflected due to refraction and are not received by the photodetector elements.

Figure 16:
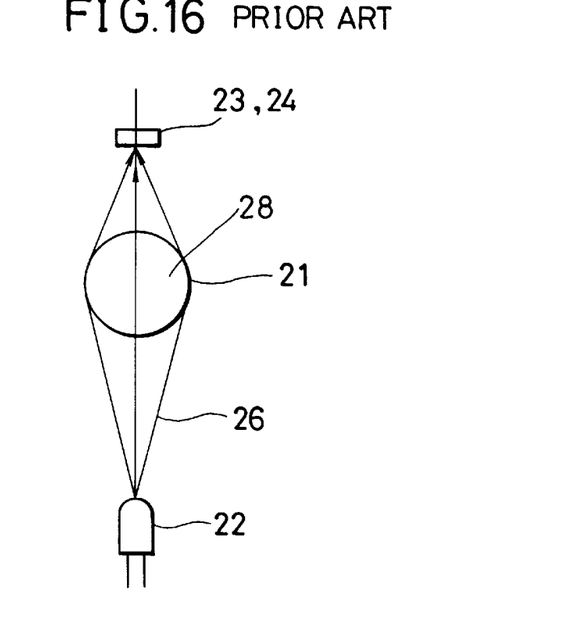
FIG. 16 is an arrow diagram along the line D—D in FIG. 14.

FIG. 16 is a cross-sectional view of the liquid portion 28. The components of the detection light 26 passing through the center of the bubble tube 21 pass through straightly and reach the photodetector elements 23 and 24. Passing through the liquid portion 28 of the bubble tube 21 except the central portion, the detection light 26 components are similarly converged to the photodetector elements 23 and 24 by optical effect. The photodetector elements 23 and 24 are designed in such a manner that they have substantially small widths to prevent receiving of noise light. Because the photodetector elements 23 and 24 have small widths for photodetection, only the detection light 26 components passing through the bubble tube 21 are received, and this increases photodetection contrast.

FIG. 18 represents change of amount of light along the axis of the detection light 26, which passes through the bubble tube 21. At the boundary of the air bubble 27, the detection light 26 is reflected, and amount of transmitting light is extremely low. By passing through nearby the boundary of the air bubble 27, the optical path of the detection light 26 is changed and its reflection increases thereby the amount of light components of the detection light 26 passing through the bubble tube 21 is reduced. Accordingly, the range G between two boundaries of the air bubble 27 is the range where the amount of light is reduced. When the air bubble 27 is moved, the range G of the low transmitting light amount is also moved. Thus, photodetection amounts of the photodetector elements 23 and 24 are changed, and tilt can be detected according to the change in the output of the photodetector elements 23 and 24.

As shown in FIG. 14, in case the bubble tube 21 is at the horizontal position, the air bubble 27 is at the center of the bubble tube 21, and amounts of the detection light 26 entering the photodetector elements 23 and 24 are equal to each other. Therefore, after comparison operation at the comparison arithmetic unit 30, there is no deviation between signal from the photodetector element 23 and signal from the photodetector element 24, and no driving signal is issued to the driving circuit 32.

Next, if the laser survey instrument is tilted and the air bubble 27 of the bubble tube 21 is moved rightward in FIG. 14, the components of the detection light 26 entering the photodetector element 24 are discarded, and components of the detection light 26 entering the photodetector element 23 are increased. Accordingly, there occurs a difference in the photodetection signals inputted to the comparison arithmetic unit 30. The resultant deviation signal is inputted to the controller 31. From the controller 31, a control signal is issued to the driving circuit 32, which drives the tilt adjusting motor 15 according to the control signal until the difference of photodetection signals from the photodetector elements 23 and 24 is eliminated.

As the photodetector elements 23 and 24, photosensor, CCD, or linear sensor may be used.

As described above, within the range G of the low transmitting light amount, the detection light 26 passing through the air bubble 27 or the detection light 26 converged near the body of the bubble tube 21 enters the photodetector elements 23 and 24. Accordingly, as seen in FIG. 18, there is a certain photodetection amount in the range G. In the conventional type tilt detecting device as described above, tilt is detected according to the difference between the light amount in the range G and the light amount on both sides of the range G. In this respect, if there is any photodetection amount in the range G, detection accuracy is decreased. In case the difference of photodetection is small, it is often difficult to detect the tilt. If the photodetector element is designed with narrower width, it is disadvantageous because the photodetection amount is reduced.

SUMMARY OF THE INVENTION

It is an object of the present invention to provide a tilt detecting device, by which it is possible to extensively reduce amount of transmitting light in the range G with low transmitting light amount and to improve accuracy to detect the tilt by blocking off noise light entering the photodetector element.

To attain the above object, the tilt detecting device according to the present invention comprises a bubble tube, a light emitting element for emitting detection light and photodetector elements arranged at opposite positions to each other with the bubble tube therebetween, and at least a light shading plate disposed on an optical path of the detection light for partially blocking off light component entering the photodetector elements from the light emitting element. The invention also provides a tilt detecting device, wherein the light shading plate is arranged between the photodetector elements and the bubble tube, and the light shading plate has a slit for blocking off light components of the detection light passing through a peripheral portion of main body of the bubble tube. The invention also provides a tilt detecting device, wherein the light shading plate is arranged between the photodetector elements and the bubble tube, and the light shading plate blocks off light components of the detection light passing through axis or near axis of the bubble tube. The invention further provides a tilt detecting device, wherein the light shading plate is arranged between the light emitting element and the bubble tube, and the light shading plate blocks off light components of the detection light passing through axis or near axis of the bubble tube. The invention further provides a tilt detecting device, wherein the light shading plate is arranged between the photodetector elements and the bubble tube, and the light shading plate has two slits and blocks off light components of the detection light passing through peripheral portion of main body of the bubble tube and light components passing through axis or near axis of the bubble tube. Further, the present invention provides a tilt detecting device, wherein a mask is provided to photodetection surfaces of the photodetector elements.

DETAILED DESCRIPTION OF THE PREFERRED EMBODIMENT

In the following, description will be given on embodiments of the present invention referring to the drawings.

Figure 1:
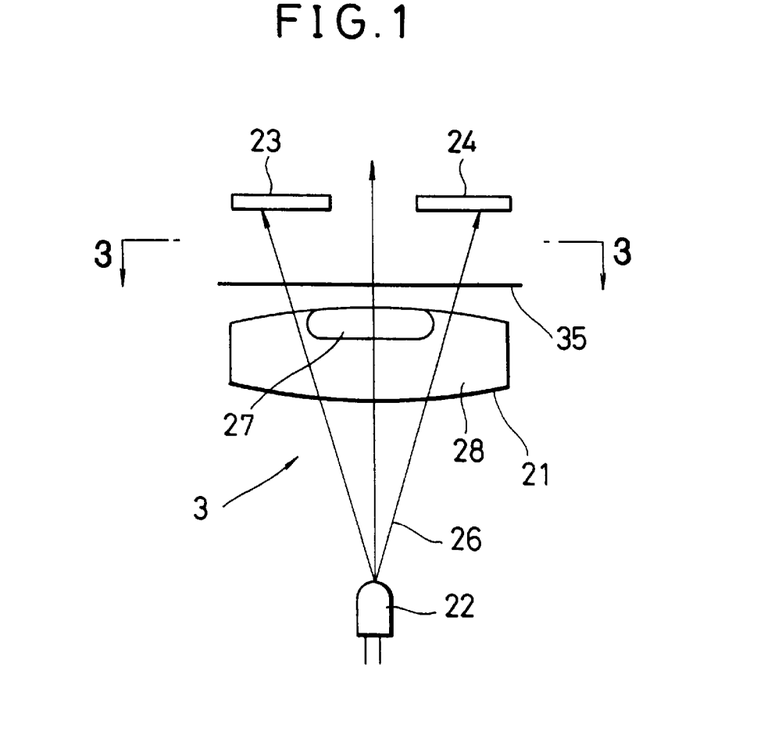
FIG. 1 is a schematical front view showing a first embodiment of the present invention.
Figure 2A:
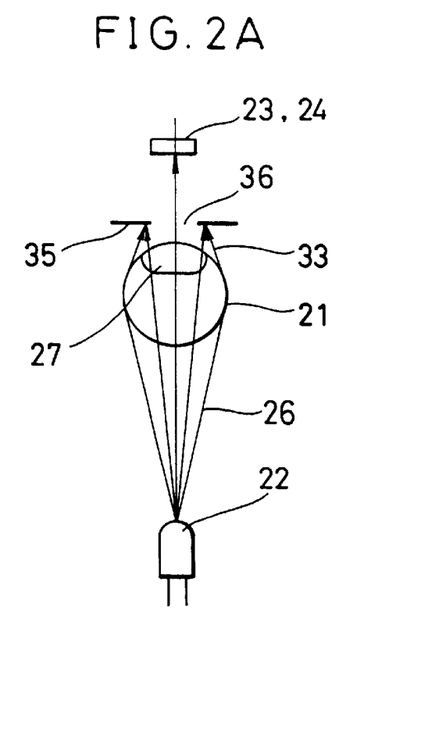
FIG. 2(A) and FIG. 2(B) each represents a side view of the first embodiment of the invention.
Figure 2B:
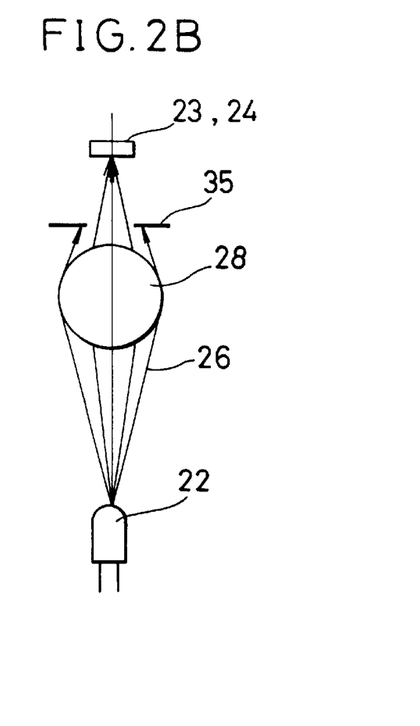
Figure 3:
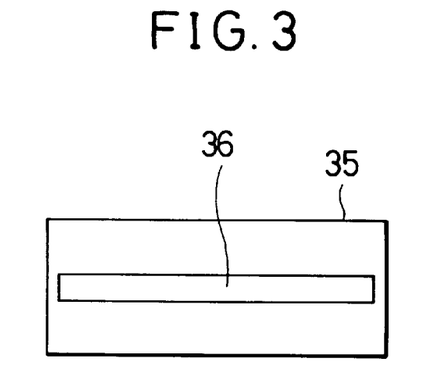
FIG. 3 is a arrow diagram along the line A—A in FIG. 1.

FIG. 1 to FIG. 3 each represents a first embodiment of the present invention, and the same component as in FIG. 14 to FIG. 16 is referred by the same symbol. Basic arrangement of the tilt detecting device is the same as that of FIG. 17. Accordingly, the detailed figure is not given here, and description of the tilt detecting device is given in connection with FIG. 17.

In a direction perpendicular to an axis of a bubble tube 21, a light emitting element 22 such as LED is arranged, and a pair of photodetector elements 23 and 24 are arranged at opposite positions to the light emitting element 22 with the bubble tube 21 therebetween and at symmetrical positions with respect to an optical axis of the light emitting element 22 with a predetermined distance between them. A light shading plate 35 is disposed between the photodetector elements 23 and 24 and the bubble tube 21 and in parallel to the photodetector elements 23 and 24. The light shading plate 35 is provided with a slit 36 which is in parallel to the axis of the bubble tube 21 and has such a width that detection light 26 converged near body of the bubble tube 21 is blocked off as shown in FIG. 2. Signals from the photodetector elements 23 and 24 are inputted to a tilt detection controller 25.

FIG. 2(A) is a cross-sectional view of an air bubble 27. The detection light 26 is emitted from the light emitting element 22. The control components of the detection light 26, which straightly pass through the bubble tube, reach the photodetector elements 23. The light components except the control light components which pass through the bubble tube are not converged but are diverged although they depend upon radius of curvature of each of the air bubble and the bubble tube. Peripheral transmitting light components 33 of the detection light 26, which have passed through the liquid portion 28 near body of the bubble tube 21, are converged by optical effect but do not enter the photodetector elements 23 and 24 because these components are blocked off by the light shading plate 35. Therefore, only the transmitting light except peripheral components reaches the photodetector elements 23 and 24. Accordingly, amount of light in the range G of low transmitting light amount is decreased, and difference between amount of light in the range G and light amount of the detection light 26, which passes through the liquid portion 28 of the bubble tube 21 without the air bubble 27, is increased. Consequently, in case the air bubble 27 moves in the bubble tube 21, i.e. in case the bubble tube 21 is tilted, big difference occurs in the photodetection amounts between the photodetector elements 23 and 24. Thus, deviation obtained by calculation of the comparison arithmetic unit 30 is also increased, and this contributes to improvement of detection accuracy.

Figure 4:
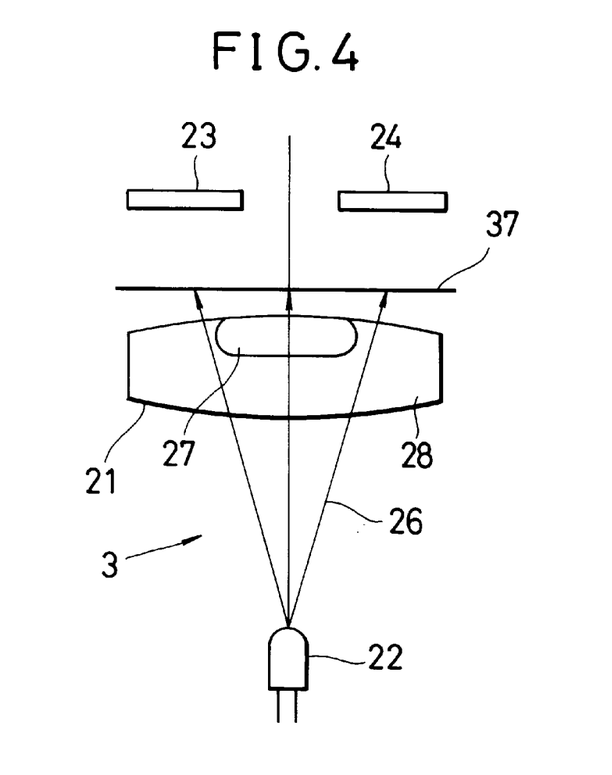
FIG. 4 is at schematical front view showing a second embodiment of the present invention.
Figure 5A:
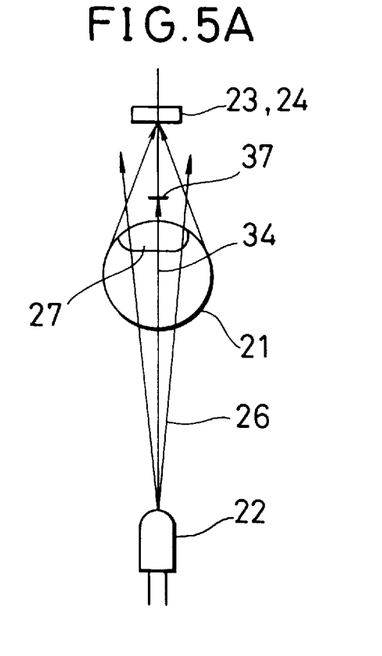
FIG. 5(A) and FIG. 5(B) each represents a side view of the second embodiment of the invention.
Figure 5B:
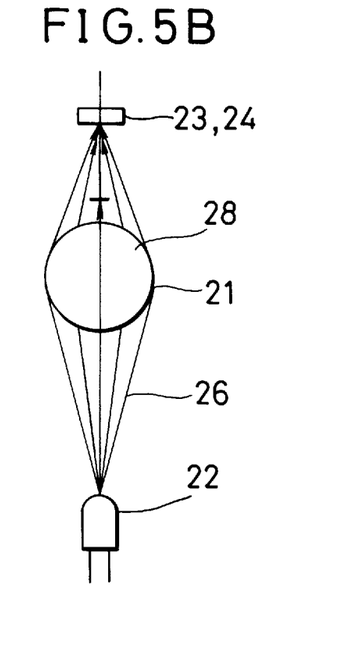

FIG. 4 and FIG. 5 each represents a second embodiment of the invention, in which a light shading plate 37 is arranged between the photodetector elements 23 and 24 and the bubble tube 21. The light shading plate 37 is a plate in form of an oblong tablet with a width narrower than the photodetector elements 23 and 24. Of the detection light 26, the shading plate 37 blocks off axis transmitting light components 34 which pass through and near the axis of the bubble tube 21.

In the second embodiment as described above, almost all of the light components of the detection light 26 passing through the center of the air bubble 27 are blocked off, and only the components of the detection light 26 passing through portion near the body of the bubble tube 21 reach the photodetector elements 23 and 24. As a result, photodetection amounts of the photodetector elements 23 and 24 are extensively reduced, and difference between light amount of the detection light 26 passing through the air bubble 27 and light amount of the detection light 26 passing through the liquid portion 28 of the bubble tube 21 without the air bubble 27 is increased. Accordingly, in case the air bubble 27 moves in the bubble tube 21, i.e. in case the bubble tube 21 is tilted, big difference occurs in photodetection amounts between the photodetector elements 23 and 24. Thus, deviation obtained by calculation of the comparison arithmetic unit 30 is also increased, and this contributes to improvement of detection accuracy.

Figure 6:
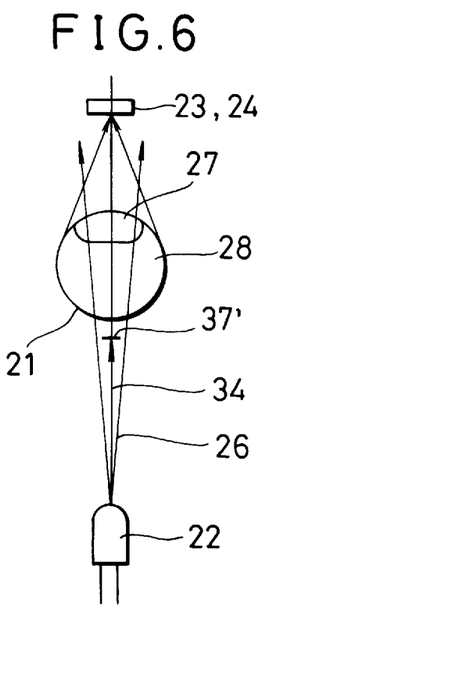
FIG. 6 is a schematical side view showing a variation of the second embodiment the present invention.

FIG. 6 shows an application example of the second embodiment shown in FIG. 5. A light shading plate 37' is arranged between the bubble tube 21 and the light emitting element 22, and it blocks off axis transmitting light components 34 of the detection light 26 emitted from the light emitting element 22 before the light components enter the bubble tube 21.

Figure 7:
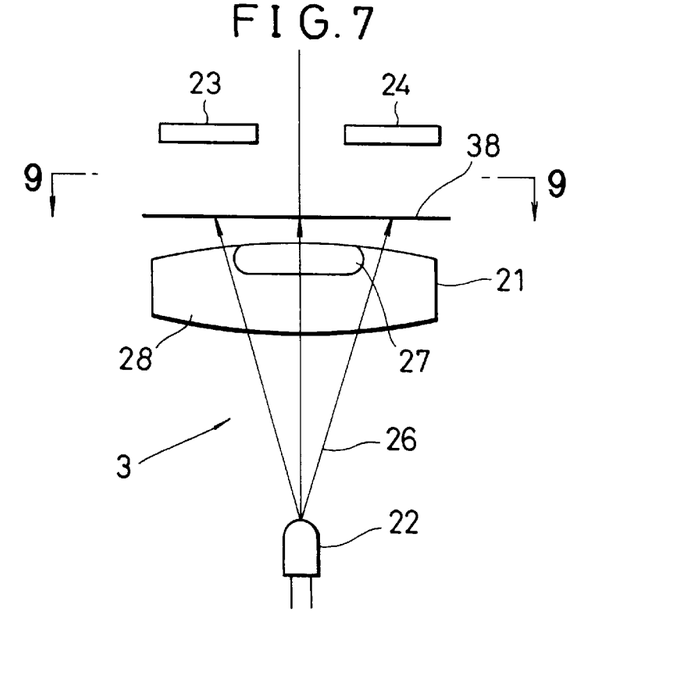
FIG. 7 is a schematical front view showing a third embodiment of the present invention.
Figure 8A:
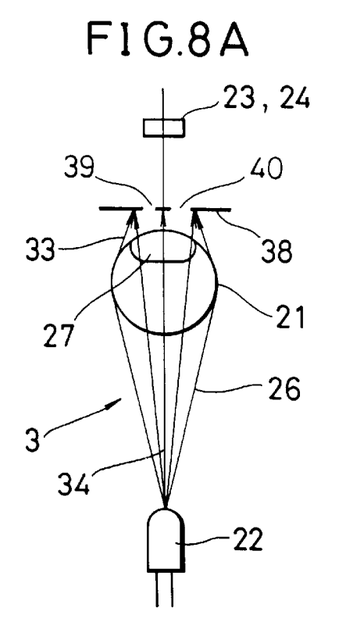
FIG. 8(A) and FIG. 8(B) each represents a side view of the third embodiment.
Figure 8B:
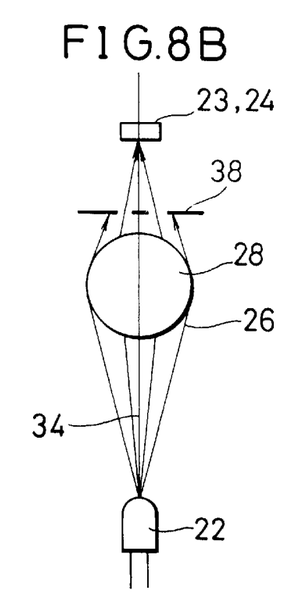
Figure 9:
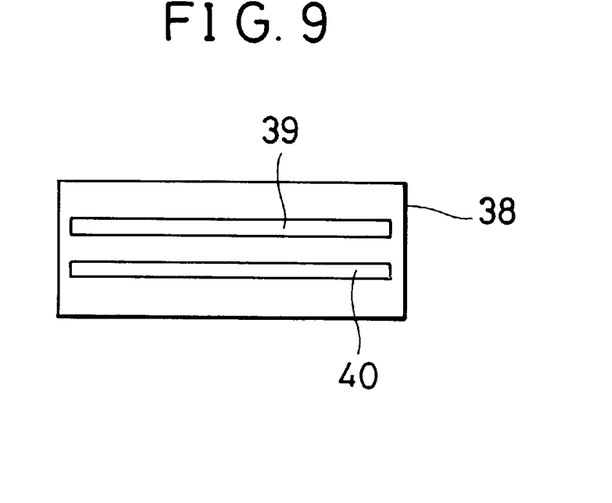
FIG. 9 is an arrow diagram along the line B—B in FIG. 7.

FIG. 7 to FIG. 9 each represents a third embodiment of the present invention, where a light shading plate 38 is arranged between the photodetector elements 23 and 24 and the bubble tube 21 as in the first embodiment. The light shading plate 38 is provided with two slits, 39 and 40, which are in parallel to axis of the bubble tube 21.

Of the detection light 26 passing through the bubble tube 21, the light shading plate 38 blocks off the peripheral transmitting light components 33 and the axis transmitting light components 34. Therefore, almost all of the light components of the detection light 26, which have passed through the portion having the air bubble 27, are blocked off, and photodetection amounts of the photodetector elements 23 and 24 are extensively decreased. Therefore, the ratio of the light amount of the detection light 26 passing through the liquid portion 28 other than the air bubble 27 to the light amount in the range G of low transmitting light amount is further increased. Then, deviation obtained by calculation of the comparison arithmetic unit 30 is also extremely increased, and this further contributes to improvement of detection accuracy.

Figure 10:
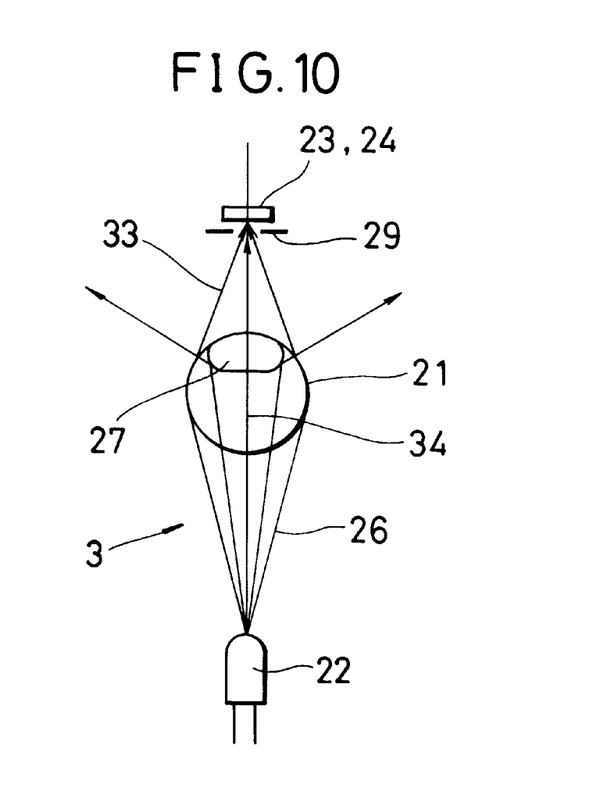
FIG. 10 is a side view of an application example of the present invention.

In fact, the photodetector elements 23 and 24 are required to have a certain size, and noise light is very likely to enter. For example, the detection light 26 passing through the air bubble 27 runs straightly or is diverged, while some of the diverged light components may reach the photodetection surface and may be turned to noise light. With respect to the noise light, it is preferable that the photodetection surface is oblong in the longitudinal direction of the bubble tube and narrow in width. As shown in FIG. 10, a mask 29 is provided closely or in proximity of the photodetection surfaces of the photodetector elements 23 and 24. Thus, it is possible to prevent photodetection of noise light.

Further, the mask 29 can be combined, for example, with the light shading plate 38 as shown in FIG. 8. By combining the mask 29 with the light shading plate 38, the components of the detection light passing through the portion with the air bubble 27 are blocked off by the light shading plate 38, and entering of the noise light is prevented by the mask 29, and this further contributes to improvement of detection accuracy.

By providing the light shading plates 35, 37, 37' and 38, total photodetection amount of the photodetector elements 23 and 24 is decreased, but sensitivity of the photodetector elements 23 and 24 is high and there is no problem. Therefore, by increasing the ratio of the light amount of the detection light 26 passing through the liquid portion 28 other than the air bubble 27 to the light amount in the range G of the low transmitting light amount, it is possible to improve detection accuracy.

Figure 11:
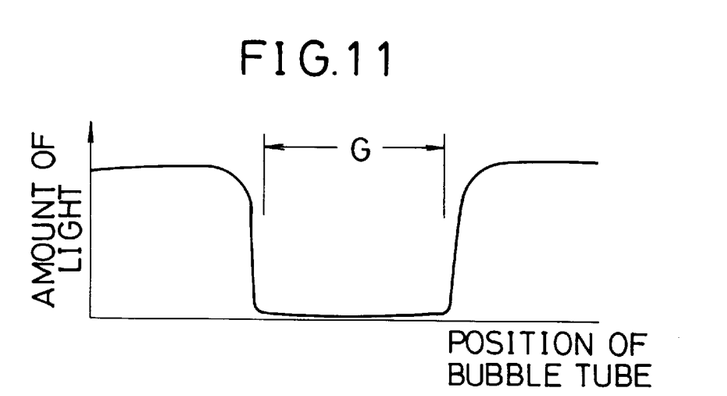
FIG. 11 is a diagram showing distribution of amount of light passing through the bubble tube in the present invention.

FIG. 11 represents a curve of light amount distribution of the photodetector elements 23 and 24 of the present invention, and this indicates that there is almost no photodetection amount in the air bubble range G, and that the ratio of light amount to that of the liquid portion is high. If it is compared with the range G in FIG. 18, which shows light amount distribution in the conventional type device, blocking effects of the shading plates 35, 37, 37' and 38 become evident.

As the photodetector elements 23 and 24, photosensor, CCD or linear sensor, line sensor, etc. may be used.

Figure 12:
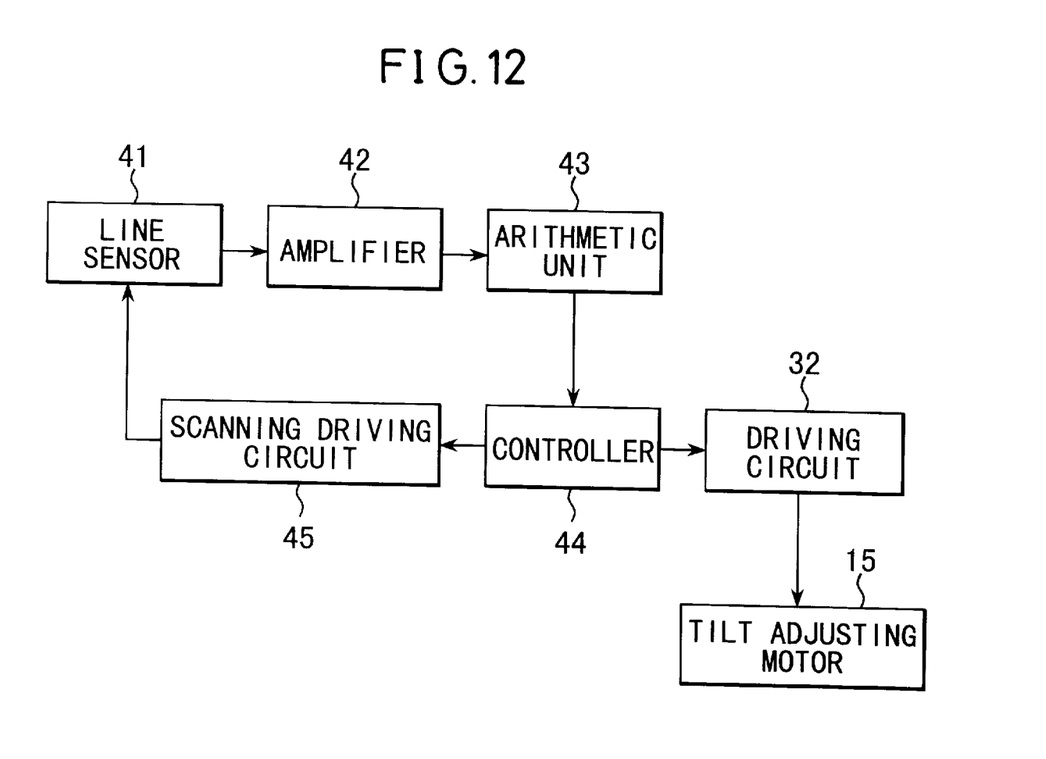
FIG. 12 is a block diagram of the device of the present invention where a line sensor is used as the photodetector element.

Description will be given now on a circuit of the tilt detecting device in case line sensors are used as the photodetector elements 23 and 24 referring to FIG. 12.

A controller 44 issues a scanning driving signal to a scanning driving circuit 45 and the scanning driving circuit 45 drives in turn a line sensor 41 based on the scanning driving signal from the controller 44. Photodetection signal from the line sensor 41 is amplified by an amplifier 42 and is inputted to an arithmetic unit 43. The arithmetic unit 43 calculates distribution of photodetection amount. By comparing the calculated light amount distribution with the reference light amount distribution, amount of tilt is calculated, and the result of the calculation is inputted to the controller 44. The controller 44 drives the tilt adjusting motor 15 via the driving circuit 32 and corrects the tilt and other factors.

As described above, in a light transmission type electric bubble tube, it is possible according to the present invention to increase difference and ratio between transmitting light amount of the air bubble and transmitting light amount of the liquid portion and this contributes to improvement of tilt detection accuracy.

What we claim are:

1. A tilt detecting device, comprising a bubble tube, a light emitting element for emitting detecting light having an optical path, photodetector elements arranged on opposite positions to said light emitting element with said bubble tube therebetween, and at least a light shading plate arranged in said optical path of said detection light for partially blocking off light components from entering said photodetection elements from said light emitting means, wherein said bubble tube has a body having a peripheral portion, and wherein said light shading plate is arranged between said photodetector elements and bubble tube, said light shading plate having a slit located such that, of said detection light, light components passing through said peripheral portion of said body of said bubble tube are blocked off.

2. A tilt detecting device according to claim 1, wherein said bubble tube has an axis, and said light shading plate has two slits designed such that, of the detecting light, light components passing through said peripheral portion of said body of said bubble tube and light components passing through said axis or near said axis of said tube are blocked off by said light shading plate.

3. A tilt detecting device according to claim 1, wherein said photodetector elements have respective photodetection surfaces, and wherein a mask is provided on or in proximity to said photodetection surfaces of said photodetector elements.

4. A tilt detecting device according to claim 2, wherein said photodetector elements have respective photodetection surfaces, and wherein a mask is provided on or in proximity to said photodetection surfaces of said photodetector elements.

5. A tilt detecting device, comprising a bubble tube, a light emitting for emitting detection light having an optical path, photodetector elements arranged on opposite positions to said light emitting with said bubble tube therebetween, and at least a light shading plate arranged in said optical path of said detection light for partially blocking off light components form entering said photodetector elements from said light emitting elements, wherein said bubble tube has an axis, and said light shading plate is arranged between said light emitting element and said bubble tube, and, of the detection light, light components passing through said axis or near said axis of said bubble tube are blocked off by said light shading plate.

6. A tilt detecting device according to claim 5, wherein said photodetector elements have respective photodetection surfaces, and wherein a mask is provided on or in proximity to said photodetcction surfaces of said photodetector elements.

7. A tilt detecting device, comprising a bubble tube, a light emitting element for emitting detection light having an optical path, photodetector elements having respective photodetection surfaces and arranged on opposite positions to said light emitting element with said bubble tube therebetween, at least a light shading plate arranged in said optical path of said detection light for partially blocking off light components from entering said photodetector elements from said light emitting element, and a mask provided to said photodetection surfaces of said photodetector elements, wherein said bubble tube has an axis, and said light shading plate is arranged between said light emitting element and said bubble tube, and of the detection light, light components passing through said axis or near said axis of said bubble tube are blocked off by said light shading plate.

\* \* \* \* \*